US008166109B2

(12) United States Patent
Lee et al.

(10) Patent No.: US 8,166,109 B2
(45) Date of Patent: Apr. 24, 2012

(54) LINKING RECOGNIZED EMOTIONS TO NON-VISUAL REPRESENTATIONS

(75) Inventors: Eric Lee, San Jose, CA (US); Fadi Jabbour, Sunnyvale, CA (US); David Lee, Sunnyvale, CA (US); Johnny Lee, San Gabriel, CA (US); Matthew Kuhlke, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 441 days.

(21) Appl. No.: 11/766,631

(22) Filed: Jun. 21, 2007

(65) Prior Publication Data

US 2008/0320080 A1  Dec. 25, 2008

(51) Int. Cl.
*G06F 15/16* (2006.01)
(52) U.S. Cl. ...... 709/204; 704/246; 434/350; 379/88.02
(58) Field of Classification Search .................. 709/204; 704/246; 434/350; 379/88.02
See application file for complete search history.

(56) References Cited

U.S. PATENT DOCUMENTS

| 6,151,571 | A * | 11/2000 | Pertrushin ...................... 704/209 |
| 7,298,256 | B2 * | 11/2007 | Sato et al. ................. 340/539.11 |
| 7,412,505 | B2 * | 8/2008 | Slemmer et al. .............. 709/223 |
| 2002/0002464 | A1 * | 1/2002 | Petrushin ....................... 704/275 |
| 2002/0135618 | A1 * | 9/2002 | Maes et al. ..................... 345/767 |
| 2002/0177115 | A1 * | 11/2002 | Moskowitz et al. ........... 434/350 |
| 2003/0055654 | A1 * | 3/2003 | Oudeyer ......................... 704/275 |
| 2004/0249634 | A1 * | 12/2004 | Degani et al. ................. 704/207 |
| 2005/0010411 | A1 * | 1/2005 | Rigazio et al. ................ 704/246 |
| 2005/0129189 | A1 * | 6/2005 | Creamer et al. ........... 379/88.02 |
| 2008/0052080 | A1 * | 2/2008 | Narayanan ..................... 704/270 |

OTHER PUBLICATIONS

Nicu Sebe et al., "Emotion Recognition using a Cauchy Naïve Bayes Classifier", International Conference on Pattern Recognition (ICPR'02), vol. 1, 2002.
Nicu Sebe et al., "Bimodal Emotion Recognition", 5th International Conference on Methods and Techniques in Behavioral Research, Wageningen, 2005.

* cited by examiner

*Primary Examiner* — Thomas Dailey
(74) *Attorney, Agent, or Firm* — Haynes and Boone, LLP

(57) ABSTRACT

A method of linking recognized emotions to non-visual representations includes receiving at a first location information corresponding to demonstrative behaviors of individuals. The behaviors of the individuals may be analyzed during a dynamic session, in which the information is used to determine emotional states of one or more of the individuals. The information about the emotional state may then be used at the first location to determine an action for improving the dynamic session.

13 Claims, 5 Drawing Sheets

LINKING RECOGNIZED EMOTIONS TO NON-VISUAL REPRESENTATIONS

TECHNICAL FIELD

The present disclosure relates generally to representation of emotions detected from video and/or audio information.

BACKGROUND

In a typical voice-based call center, call conference, or remote training system, it can be difficult to directly gauge the emotional state of the participants unless they speak out directly to express their concerns (e.g., "I don't understand"). For example, in a dynamic session, it may be valuable to a presenter or speaker to be able to assess whether participants are confused, agree/disagree, absorbing the content, bored, etc. A dynamic session is any session in which a person is talking or reacting in response to stimuli, such as a training session, request for information, request for help, automated questions, etc. It may be advantageous for the presenter to get an overall perspective of the participants' mental or emotional reactions so that he/she can improve the presentation during the actual presentation in real time, such as repeating parts of a current topic, restating portions for better impact, moving on to another topic, challenging the participants to respond or focus on a subject, referring the participant(s) to specific references, etc.

Recognition of emotional state may be advantageous in other scenarios, such as self-service voice applications, which are typically deployed in call centers. If the emotional state of the caller is not available, an automated system may not be equipped to react to caller emotions, such as when a caller becomes frustrated with the system, is in an emergency, or is in a situation requiring urgency.

DESCRIPTION

Overview

In one embodiment, a method of linking recognized emotions to non-visual representations includes receiving, at a first location, information corresponding to demonstrative behaviors of individuals. The behaviors of the individuals may be analyzed during a dynamic session, in which the information is used to determine emotional states of one or more of the individuals. The information about the emotional state may then be used at the first location to determine an action for improving the dynamic session.

Description of Example Embodiments

Figure 1:
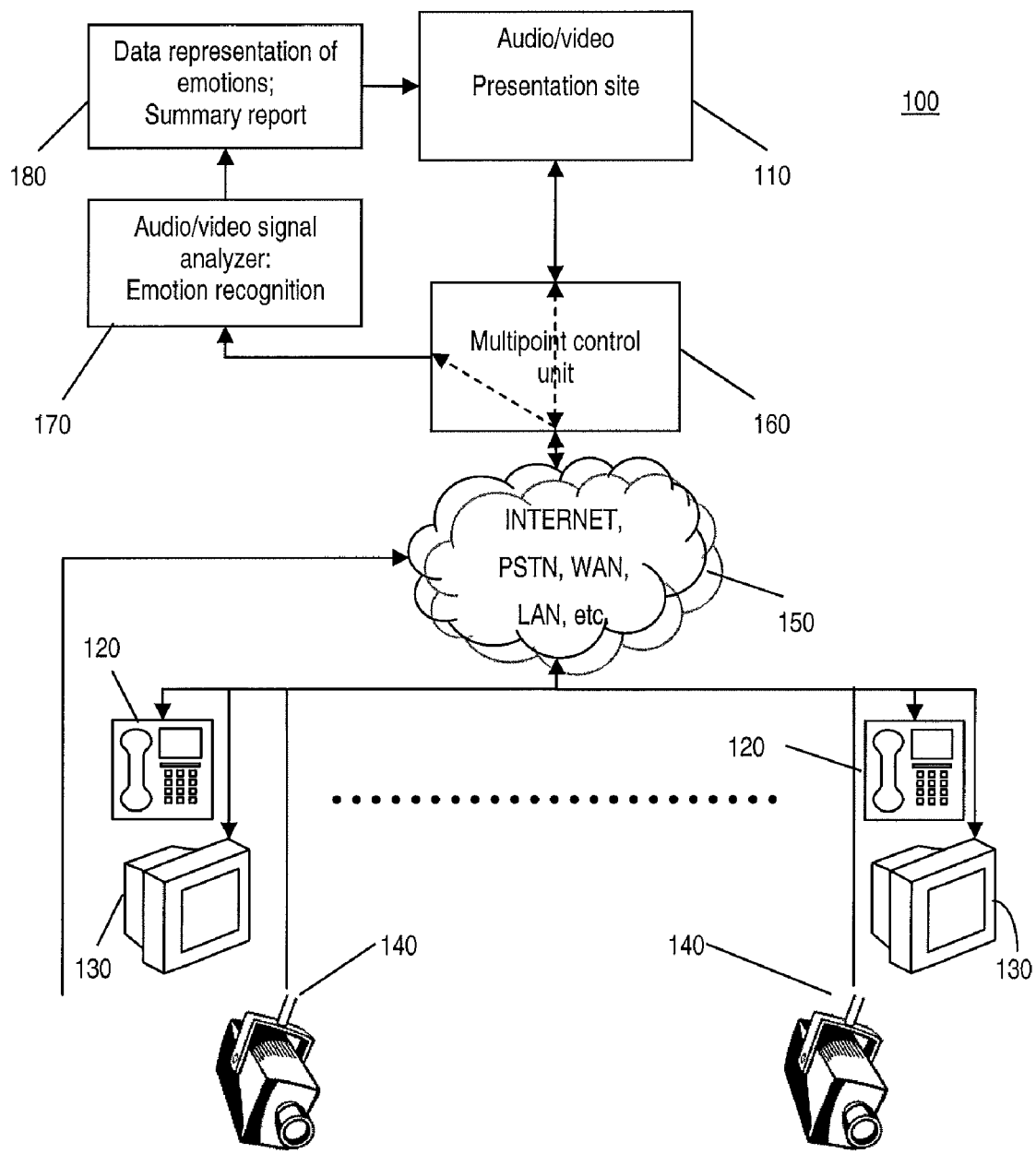
FIG. 1 illustrates a conference system for linking recognized emotions to a non-visual representation, in accordance with an embodiment of the disclosure.

FIG. 1 shows a conference phone call system 100 according to one embodiment. In phone call system 100, a speaker may be giving a presentation from an audio and/or video presentation site 110 to a remote audience, which may include a plurality of individual participants or groups of participants equipped with audio communications, such as an audio system 120 (e.g., a telephone system), and, optionally, a video display 130. The speaker may not have direct video for visual feedback from the participants or may not want such feedback for practical reasons, so that direct access to visual imagery of the participants is not available. However, participants may be monitored by video cameras 140 which provide video feeds to systems designed for image analysis (described below). Audio feedback from participants via audio system 120 may also be provided to systems for audio analysis (described below).

Communication between presentation site 110 and participants may be over a network 150 implemented by any combination of land lines and wireless protocols, which may include, but are not limited to, the Internet, local area networks (LAN), wide area networks (WAN), and public switched telephone network (PSTN). Conference communications may be enabled by use of a multipoint control unit (MCU) 160 at a node in the network to provide conference bridging between a plurality of participants and one or more presenters.

While presentation video may only be transmitted one way, i.e., from presenter to participants, audio between presenter and participants may be bi-directional for interactive purposes. Video is from the presenter to the participants; however, video is also available from cameras 140, which capture reactions and emotions of the participants and transmit the corresponding information to MCU 160. MCU 16, in turn, conveys the information to an emotion recognition system 170, which may be incorporated in presentation site 11 0 or conveniently located relative thereto. Emotion recognition system 170 processes and passes data (which will be described in detail below) to a summary report generator 180, which provides a concise report for the presenter to use, either in real-time use or for later reference. The report includes a non-visual representation of the participant's emotions, where non-visual representation, as used herein, are representations that do not include actual audio or video of the subject whose emotions are being detected. Examples of non-visual representations are a list or graphical form as an image that may appear on a display visible to the presenter.

In the embodiment of FIG. 1, a single emotional recognition system 170 is utilized for a plurality of participants at multiple presentation sites. The benefit of this arrangement is that only one implementation of emotion analysis software is needed. This comes at the cost of the bandwidth that may be required to transport video data from a multitude of participant or presentation sites. Alternatively (not shown), video monitoring may be analyzed at each remote presentation site equipped with emotion recognition system 170 and a non-visual representation of results transmitted over network 150 directly to the presenter via summary report generator 180. However, in exchange for a reduced transmission bandwidth that may be required, implementations of emotion recognition system 170 are required at each participant site.

Emotion recognition system 170 may utilize portions of the audio and/or video feedback from participants corresponding to portions of the presentation. The recognized emotion characteristics are reduced in summary report generator 180 to concise format easily used by the presenter, such as lists and/or graphs, which may include group statistics of different detected emotions, individual participant characteristics, or the like. The participants may therefore be monitored via video camera 140 and/or audio systems 120, which may be associated with the conference phone system and which may be adapted to evaluate and recognize the emotional states of the participants. Periodically, corresponding to portions of the presentation, the summary report system may provide individual or composite analysis of the emotional states of the participants to the speaker/presenter.

The summary report may be in the form of a graph, a list or statistics of the incidence(s) of boredom, attentiveness, confusion, idea recognition, etc. Based on the provided information, the speaker may review, proceed, or otherwise alter the presentation in real-time. In cases where the presentation is a recording and no real-time feedback is available, audio and video recorded reactions may still be obtained to provide offline emotion information linked to a non-visual representation and a report relating to portions of the presentation for future revision.

Figure 2:
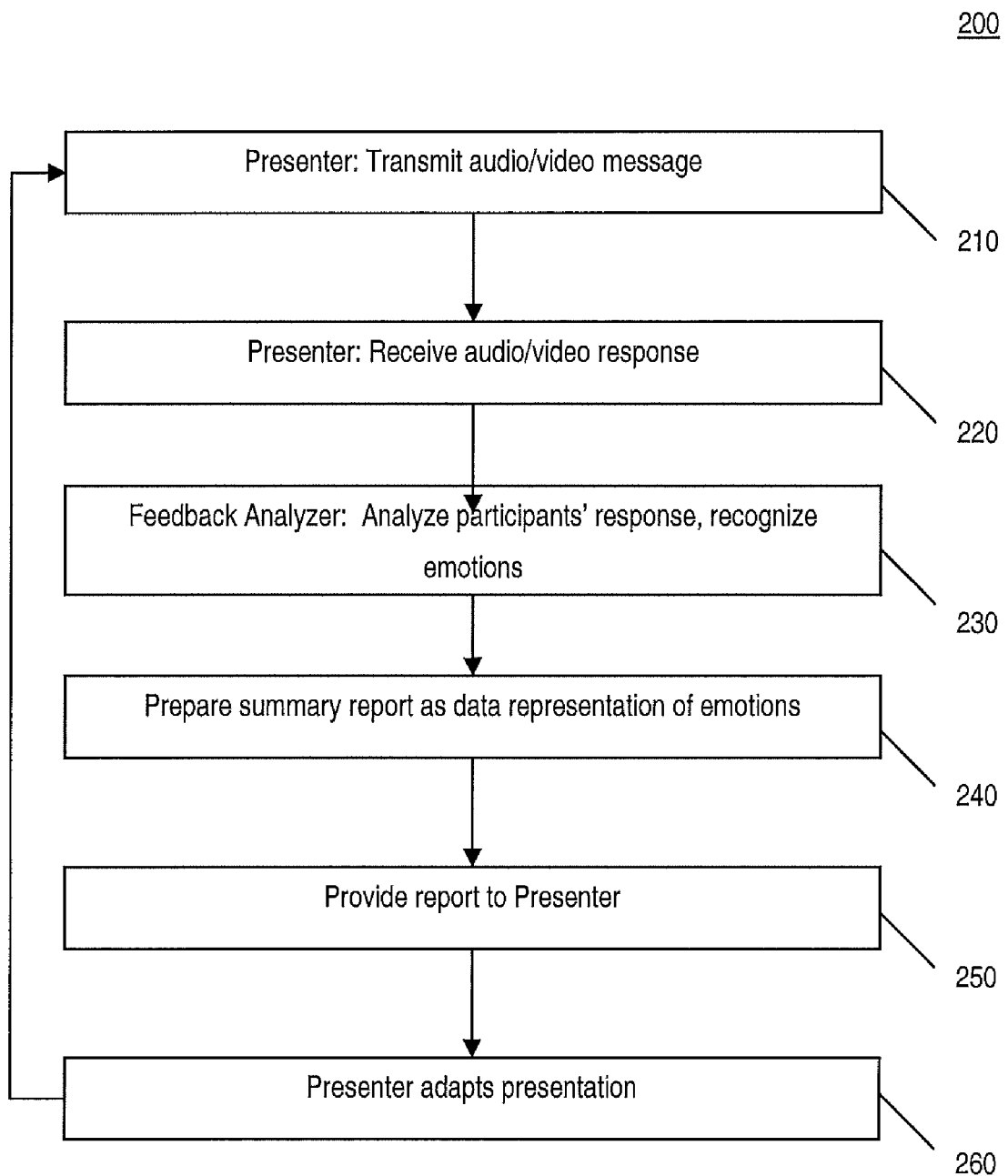
FIG. 2 illustrates a method in a conference system for linking recognized emotions to a non-visual representation, in accordance with an embodiment of the disclosure.

FIGS. 2-5 are example embodiments of systems that may advantageously use non-visual representations of linked emotions. FIG. 2 illustrates a method 200 in a call conference system for linking recognized emotions to a non-visual representation, in accordance with an embodiment of the disclosure. A presenter transmits (block 210) a presentation that may include audio and/or video media, which may also be live or taped. The presenter then receives responses 220 from the participants during and in response to the presentation. The responses may only be audio, as is typical of conference calls. Alternatively, the conference call may be configured to include video transmission between presenter and one or more of the participants, as described above. The audio and/or video responses (e.g., demonstrative responses) from participants are analyzed (block 230) for emotional content. Recognized emotions may be identified from portions (i.e., segments) of the audio/video feedback responses corresponding to specific portions of the presentation. Emotion detection can be performed using known techniques, such as "Emotion Recognition using a Cauchy Naive Bayes Classifier", N. Sebe, I. Cohen, A. Garg, M. S. Lew, T. S. Huang, International Conference on Pattern Recognition (ICPR'02), Vol. 1, pp. 17-20, Quebec City, Canada, August 2002, and "Bimodal Emotion Recognition", N. Sebe, E. Bakker, I. Cohen, T. Gevers, T. S. Huang, 5th International Conference on Methods and Techniques in Behavioral Research, Wageningen, The Netherlands, August 2005, all of which are incorporated by reference in their entirety.

A data reduction system or summary report generator then prepares a report or other non-visual representation format (block 240) to reduce the analyzed audio and/or visual information to a concise non-visual summary of the recognized emotions corresponding to the portion of the presentation during which the participant's responses are obtained. The report may be provided (block 250) to the presenter in any of a number of ways, e.g., as a printout, on a monitor, via a verbal message, etc. It may include group or individual statistics on emotional behaviors of participants, which the presenter may then use to adapt or revise (block 260) the content, methods, or progress of the presentation. The method is iterative, and the presenter may continue the presentation (returning via block 210) and receive report summaries related to subsequent portions of the presentation.

Figure 3:
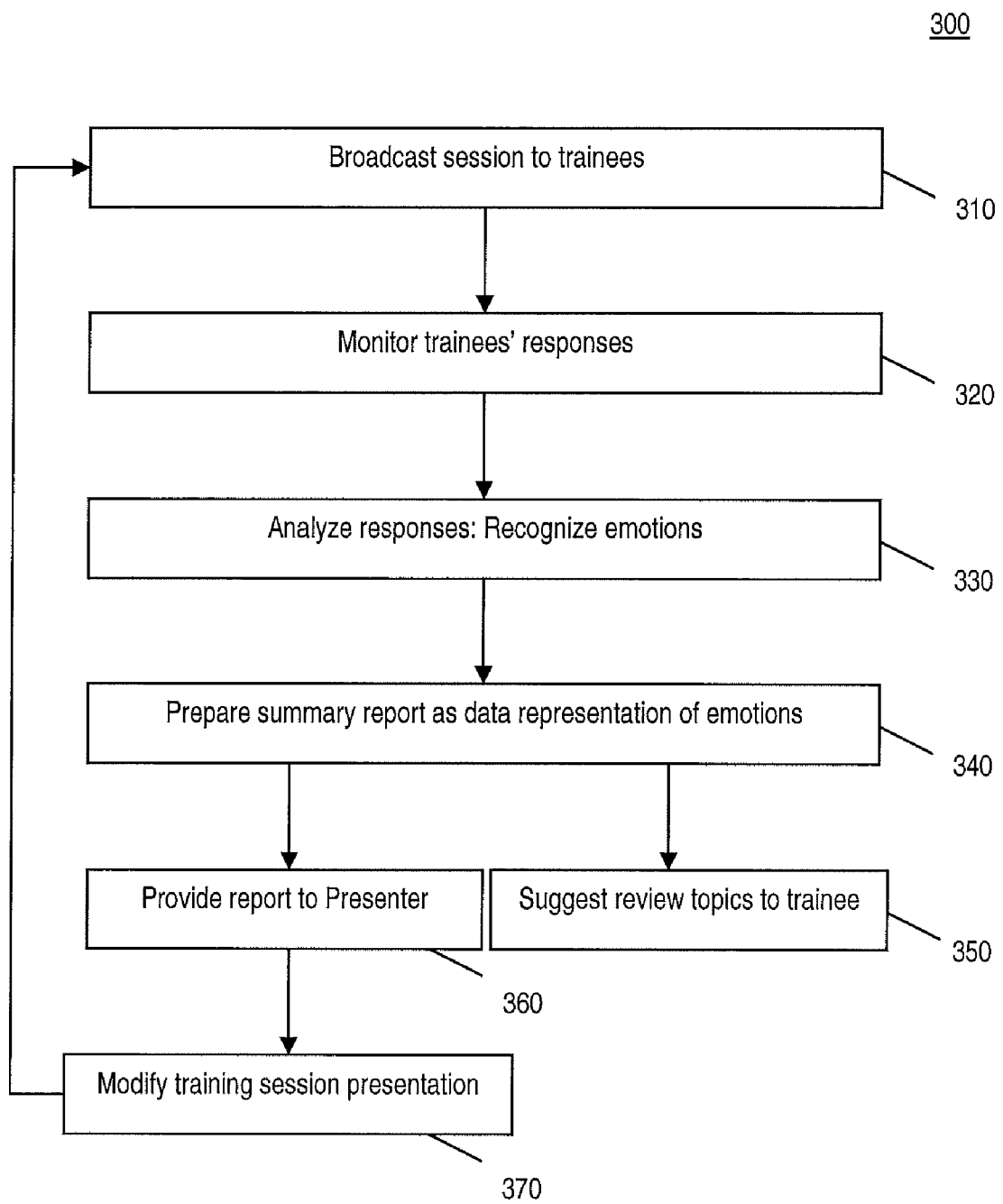
FIG. 3 illustrates a method in a video training system for lnking recognized emotions to a non-visual representation, in accordance with an embodiment of the disclosure.

FIG. 3 illustrates a method 300 for linking recognized emotions to a non-visual representation in a video training session, in accordance with an embodiment of the disclosure. It will be recognized that many features of a system for video training may be identical or similar to that illustrated in FIG. 1 for a conference call presentation, and will therefore not be described in detail.

A video and/or audio training session may be broadcast (block 310) to participating trainees at a plurality of remote locations. Online education is an example of such training. As discussed above, the trainee location(s) may be equipped with audio and/or video recording and transmitting systems for feedback to the broadcast site. These systems may monitor (block 320) the reactions of one or more of the trainees in response to corresponding portions of the training session. The monitored portions may then be analyzed (block 330) for recognition of emotions. Report preparation (block 340) provides a summary of the emotional reactions recognized that were exhibited by the trainee(s), where the summary comprises a non-visual report that may include a list of emotional behaviors (e.g., confusion, recognition/understanding, boredom, etc.), graphs of the incidence of such emotion behaviors, and may correspond to portions of the training session. At least two options may be exercised with the results of summary reports generated in this fashion: The reports may be used to suggest (block 350) to one or more of the trainees topics that may be reviewed for the trainees' benefit. The reports may also be provided (block 360) to the presenter for evaluation of the responses by the trainees resulting from session material on a portion-by-portion basis. The presenter, or other responsible party, may modify (block 370) the training session material for subsequent presentations.

Figure 4:
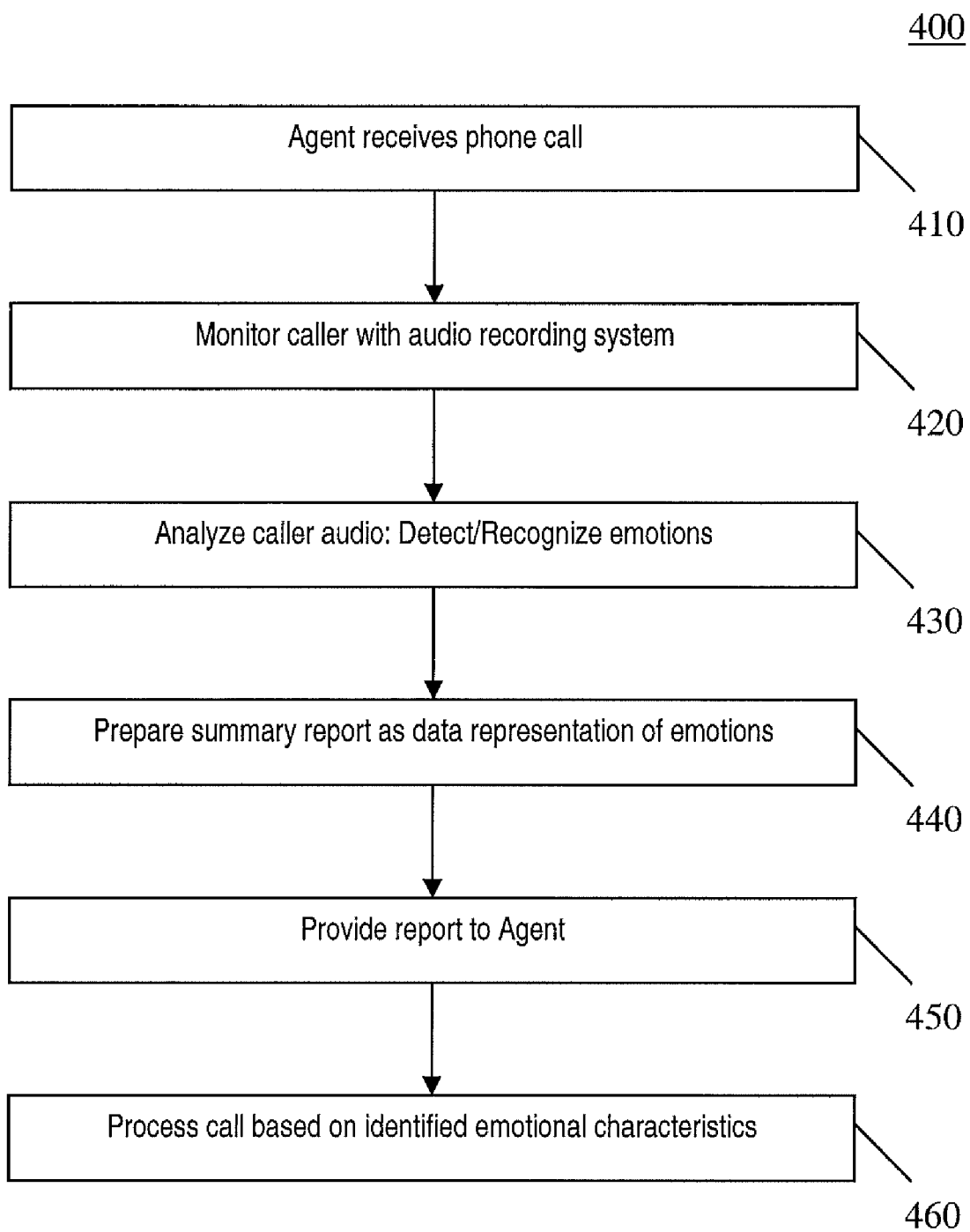
FIG. 4 illustrates a method in a call center system for linking recognized emotions to a non-visual representation, in accordance with an embodiment of the disclosure.

FIG. 4 illustrates a method 400 in a call center system for linking recognized emotions to a non-visual representation, in accordance with an embodiment of the disclosure. It will be recognized that many features of a call center system may be identical or similar to that required for the method illustrated in FIG. 1 for a conference call presentation, and will therefore not be described in detail.

In a call center, an agent receives (block 410) a call from a caller. The caller, for example, may be a customer seeking information or service relating to a product, emergency medical or police assistance. In the course of the call, the caller's responses may be monitored (block 420) by an audio recording system. The system may be equipped to analyze, in portions or segments, and recognize (block 430) emotional characteristics corresponding to the portion and content of the agent's questions and the caller's answers, responses, or statements. The analysis may then result in a summary report being prepared (block 430) and provided (block 450) to the agent while still on call with the caller. This report, as described above, may comprise a non-visual representation (e.g., a narrative description, list, or graphical display of different emotional parameters), which the agent may use to direct the further handling or processing (block 460) of the call. This may include, for example, altering the agent's response behavior to improve the resolution of the issue, transfer to another agent better skilled in the matter, or to a higher level of supervisory authority in a position to resolve the matter.

Figure 5:
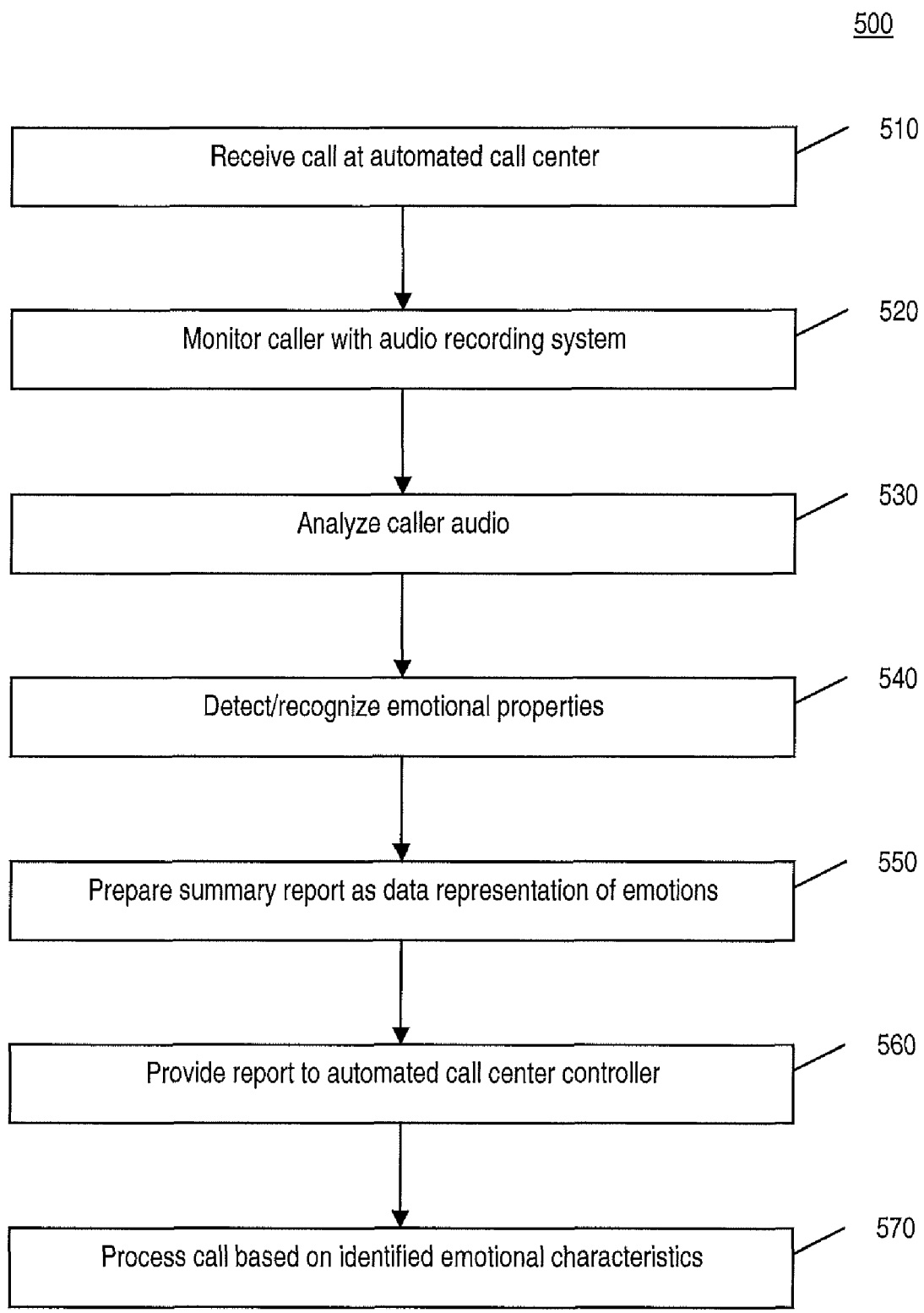
FIG. 5 illustrates a method in a self-service or automated answering system for linking recognized emotions to a non-visual representation, in accordance with an embodiment of the disclosure.

FIG. 5 illustrates a method 500 in a self-service or automated answering system for linking recognized emotions to a non-visual representation, in accordance with an embodiment of the disclosure. In an automated answering system, a call is first received (block 510). The caller's audio transmission is monitored (block 520) with recording equipment, which may be equipped to store the audio from a time interval segment in a buffer memory or register. The caller's audio signal is analyzed (block 530), such as in time interval segments, in a system similar to audio/video signal analyzer 170 shown in FIG. 1 (but limited to audio analysis). The analysis may detect and/or recognize (block 540) emotional properties from the content of the audio signal. A summary report may then be prepared (block 550) to generate a non-visual representation of the emotions detected, e.g., as a list, graph, etc. The report is provided (block 560) to an automated call center controller. The report is in a format that enables the controller to read and execute further actions based on the content of the report. The controller then processes (block 570) the call based on the identified emotions. Process actions may include forwarding the caller to an agent to respond in person to the caller, provide additional options for more information, etc.

In any of the above method embodiments, the audio/video recording may be paired portion-by-portion to the linked non-visual representation of recognized emotions and archived for later review or for real-time processing. This database of recorded information may be of value in evaluating emotion recognition algorithms for accuracy and effectiveness.

Therefore, it should be understood that the invention can be practiced with modification and alteration within the spirit and scope of the appended claims. The description is not intended to be exhaustive or to limit the invention to the precise form disclosed. It should be understood that the invention can be practiced with modification and alteration and that the invention not be limited only by the claims and the equivalents thereof.

What is claimed is:

1. A method comprising:
    receiving at a first location of a presenter or speaker audio and/or video information over a communication network corresponding to demonstrative behaviors that are responses of a remote audience comprising of one or more individuals during a dynamic session over the communication network, the dynamic session comprising one of a call conference, a call center system, an automated answering system, or a training presentation;
    recording the information corresponding to the demonstrative behaviors in a portion-by-portion basis during the dynamic session, wherein each specific portion corresponds to specific presenter or speaker content segments of the dynamic session,
    determining for each specific portion during the dynamic session, by a Cauchy naïve classifier or bimodal emotional state recognition system, an emotional state of one or more individuals based on the demonstrative behaviors from the information of the one or more individuals during the dynamic session;
    creating a summary report for each specific portion during the dynamic session, wherein the summary report comprises a non-visual representation of the emotional state and provides analysis of the emotional state of the one or more individuals corresponding to a respective specific portion;
    providing the summary report for each specific portion to the presenter or speaker during the dynamic session at the first location;
    determining an action in response to the summary report during the dynamic session; and
    continuing, by the presenter or speaker, the dynamic session to the remote audience.

2. The method of claim 1, wherein the demonstrative behaviors comprise verbal behaviors, visual behaviors, or a combination thereof.

3. The method of claim 1, wherein the summary report comprises a list or a graphical form as an image.

4. The method of claim 3, wherein the recording is in time segment portions.

5. The method of claim 1, wherein the action is determined in real time.

6. The method of claim 1, wherein the dynamic session comprises an audio session between an individual and a call center agent of the call center system who processes the call based on the information.

7. The method of claim 1, wherein the dynamic session is an audio session between an individual caller and the automated call center answering system having a controller that controls the automated call center answering system on the basis of the information.

8. A system comprising:
    a recording system that provides information to a presenter or speaker and is coupled to a communication network, wherein the recording system records audio and/or video information corresponding to demonstrative behaviors that are responses of a remote audience comprising of one or more individuals during a dynamic session over the communication network,
    the dynamic session comprising one of a call conference, a call center system, an automated answering system, or a training presentation; and
    the information corresponding to the demonstrative behaviors is recorded in a portion-by-portion basis during the dynamic session, wherein each specific portion corresponds to specific presenter or speaker content segments of the dynamic session;
    a Cauchy naïve classifier or bimodal emotional state recognition system operatively coupled to the recording system and configured to determine an emotional state of one or more individuals based on the demonstrative behaviors from the information of the one or more individuals during the dynamic session; and
    a data output system configured to provide to the presenter or speaker during the dynamic session a summary report for each specific portion, wherein the summary report comprises a non-visual representation of the emotional state and provides analysis of the emotional state of the one or more individuals corresponding to a respective specific portion,
    the summary report allowing an action to occur while continuing the dynamic session.

9. The system of claim 8, wherein the summary report comprises a computer display, a printed sheet, an audio message, or a verbal message.

10. The system of claim 8, wherein the demonstrative behavior is verbal, visual, or a combination thereof.

11. The system of claim 8, further comprising a memory for storing signals corresponding to the demonstrative behaviors and the summary report.

12. The system of claim 8, wherein the emotional state recognition system is located at a single location and is configured to receive signals corresponding to the demonstrative behaviors from different locations.

13. The system of claim 8, wherein the emotional state recognition system comprises a plurality of systems, with one or more of the systems co-located with the recording system.

* * * * *